Sept. 26, 1939.   A. PERENY   2,174,061
DRIVING CONTROL MECHANISM FOR ROTARY DRIVEN UNITS
Filed Dec. 16, 1937
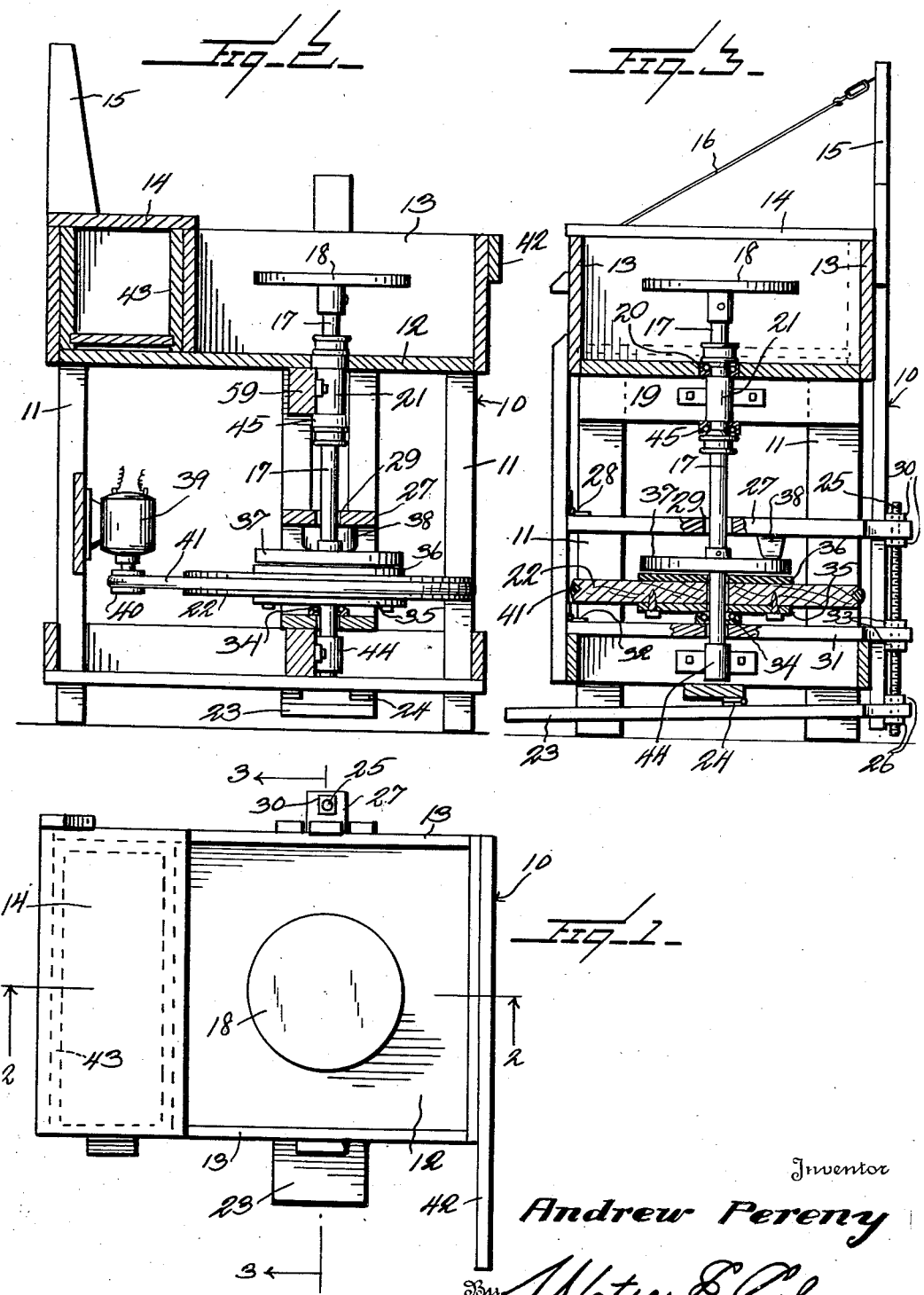
Inventor
Andrew Pereny
By Watson E. Coleman
Attorney Patented Sept. 26, 1939

2,174,061

UNITED STATES PATENT OFFICE 2,174,061

DRIVING CONTROL MECHANISM FOR ROTARY DRIVEN UNITS

Andrew Pereny, Columbus, Ohio

Application December 16, 1937, Serial No. 180,208

2 Claims. (Cl. 192—18)

This invention relates to control means for rotary driven units such as potters' wheels and the like.

The general object of the invention is to provide drive mechanism for a potter's wheel or other driven unit in which the speed of rotation of the wheel is entirely under the control of the operator and in which this speed control is secured by means of a friction clutch and a pedal, thus permitting the operator, by means of the foot control, to secure either a steady flow of speed at any desired R. P. M. within the range of the motor or secure a variable speed which may be varied at any instant without stopping the motor and without the necessity of the operator using his hands to control the speed, thus permitting the operator's hands to be free for other work which must be performed while the wheel or driven unit is in motion.

A further object is to provide a very simple structure of this character whose initial cost is relatively low, whose upkeep is also low, and which is portable and may be connected up with any usual source of electric current.

Other objects have to do with certain details of construction as will appear more fully hereinafter.

My invention is illustrated in the accompanying drawing wherein:

Fig. 1 is a top plan view of a potter's wheel showing the control mechanism therefor constructed in accordance with my invention.

Fig. 2 is a section on the line 2—2 of Fig. 1.

Fig. 3 is a section on the line 3—3 of Fig. 1.

Since the present invention has been designed for use primarily with a potter's wheel, the description of the invention will be made in connection with such structure as it is shown in the drawing, but it is to be understood that the invention is not to be limited to use with such a machine but may be used in association with any rotary driven unit.

Referring to the drawing, 10 designates a stand generally, the stand having legs 11 and a table 12 having upstanding side walls 13. Attached to the side walls 13 and extending across one end of the space defined by these side walls is a wedging board 14 upon which the clay may be worked or blended into proper consistency, and extending upward from one corner of this wedging board is an upright 15 from which a taut wire 16 extends downwardly and laterally and is attached at its lower end to the frame of this machine, this wire constituting a wire cutter by which the clay may be cut.

Extending through the table bottom 12 and mounted in suitable bearings therein is a shaft 17 carrying at its upper end the disk wheel 18 upon which clay is placed for molding by the hands of the operator. The shaft 17 carries upon it the clutch disk 37. Preferably this shaft is supported by ball bearings 20 and a sleeve bearing 21 attached to a brace 19. Thus the shaft is held in a truly vertical position so that the shaft will not in any way wobble.

Disposed to loosely surround the shaft 17 but concentric therewith is the fly wheel 22. This fly wheel is relatively large but does not have to be heavy. The fly wheel 22 is vertically movable to bring it into or out of frictional engagement with the disk 37 and for this purpose, a treadle 23 is provided which is hinged at 24, one end of the treadle projecting out beyond a bracing element of the frame.

The treadle at its rear end has an aperture for the passage of a vertical bolt 25, the bolt being held in adjusted position on the treadle by the oppositely disposed nuts 26. The upper end of the bolt engages with a brake lever 27 extending from front to rear hinged at 28 and having an aperture 29 for the passage of the shaft 17. The free end of the lever 27 is apertured for the passage of the bolt 25 and is adjustably held in engagement with the bolt by means of the opposed nuts 30. The fly wheel 22 is carried by a lever 31 hinged at 32 and parallel to the lever 27. The forward end of lever 31 is apertured for the passage of the bolt 25 and is adjustably engaged with the bolt by the two nuts 33. The upper face of lever 31 carries a ball bearing 34 and the underface of the preferably wooden fly wheel 22 carries a wear plate 35 which is supported on the ball bearing 34. The upper face of the fly wheel has a leather layer or facing piece 36 which confronts the friction wheel or clutch disk 37 mounted on the shaft 17. Mounted on lever 27 is a brake block 38 which engages the upper face of the friction wheel 37 when the brake lever 27 and the lever 31 are lowered by relieving pressure upon the forward end of the pedal 23.

The fly wheel is driven by an electric motor 39 having thereon the pulley 40. A band 41 passes over this pulley and around the fly wheel 22. Means (not shown) is provided whereby electric current may be taken to the motor through the medium of a plug and cord and a switch (not shown) is also provided whereby the current may be cut off when desired or allowed to flow. This switch is preferably disposed on the frame of the table so that it may be handy to the operator. The motor is protected from particles of clay or other matter thrown off from the rapidly revolving wheel 18 by placing the motor beneath the bottom 12 of the box in which the potter's wheel is disposed. One end of this box or casing formed by the bottom 12 and the walls 13 is provided with the outwardly projecting arm 42 which is used as a hip rest for the operator since it is necessary for him to stand on one foot while using the wheel, the other foot being used in controlling the treadle 23. This projecting arm 42 thus aids the operator in keeping his balance while working. This projecting member 42 may also be used for supporting a board constituting an arm rest in case the operator needs one.

The fly wheel is preferably made of wood while the friction disk 37 is of steel. The motor is so disposed as to avoid belt slippage and power loss. A drawer 43 is disposed beneath the clay working table or wedging board 14, as it is called, for the reception of tools and the like. It will be noted that the lower end of shaft 17 is supported in a sleeve bearing 44 and that the upper end of the shaft is also supported in the sleeve bearing 21 and that the vertical thrust of this shaft is taken up by the ball bearing units 20 and 45.

In the operation of this machine, when the pedal 23 is depressed by the foot, the rear end forces the bolt 25 upward, lifting the levers 31 and 27. This lifts the brake block 38 off of the friction wheel 37 and raises the fly wheel into position against the clutch plate or disk 37, causing the fly wheel to frictionally drive the shaft 17 and the potter's wheel 18. When the foot pedal 23 is released, the fly wheel disengages from the friction wheel 37 and the brake block 38 moves downward to brake against the friction wheel 37. By varying the foot pressure, the operator varies the pressure with which the parts 22 and 37 engage and thereby controls the speed of the rotary unit, which in this case is the wheel head or potter's wheel proper 18.

The important part of my invention resides in the means for controlling the speed of the rotary driven unit such as the potter's wheel shown entirely by the foot of the operator, leaving his hands free for other work. With this speed controlling mechanism the rotary unit may be instantly stopped, started or driven at any desired speed, either steadily or with more or less constant variations of speed as required by the work being done.

While I have illustrated a form of invention which has been found to be extremely practical, obviously slight changes might be made without departing from the spirit of the invention as defined in the appended claims.

What is claimed is:

1. A mechanism of the character described, including a supporting frame, a vertical shaft carried thereby, a friction disk mounted upon the shaft, a fly wheel loosely surrounding the shaft and having a friction facing, the fly wheel being vertically movable into or out of engagement with the friction disk, a motor operatively connected to the fly wheel, a brake lever disposed above the friction disk, a lever supporting the fly wheel, a pedal hingedly mounted below the last-named lever, a vertically extending bolt connecting both of the said levers and the pedal for unitary movement, and opposed nuts engaging each of said levers and the pedal with said bolt, the brake lever having a brake block bearing against the friction wheel when the brake lever is lowered.

2. A mechanism of the character described, including a supporting frame, a vertical rotary shaft carried by said frame and held against axial movement, a friction disk mounted upon said shaft, a lever pivotally mounted at one end beneath said friction disk and in spaced relation therewith and extending perpendicularly to the shaft, the lever having a central aperture through which the shaft loosely passes, a fly wheel loosely encircling the shaft and rotatably supported upon said lever and adapted to be moved vertically by the lever for frictional contact with said disk, a second lever extending transversely of the shaft above the disk and pivotally mounted at one end, a foot lever pivotally mounted intermediate its ends below the shaft, said levers all lying in substantially the same vertical plane, means for driving said fly wheel, a brake block carried by the second-mentioned lever and adapted to frictionally contact said disk, and an operative connection between the levers which is so constructed that upon oscillation of the last-mentioned lever the said fly wheel will be raised into frictional contact with the disk and the brake block will be removed from braking contact with the disk.

ANDREW PERENY.